United States Patent
Nemec et al.

[19]

[11] Patent Number: 6,010,387
[45] Date of Patent: *Jan. 4, 2000

[54] MODULAR MULTI-LAYER THREE-DIMENSIONAL FIGURES FROM REARRANGABLE FLEXIBLE ELEMENTS

[75] Inventors: Nadine Nemec, East Lansdowne; Avra Pressman, Ardmore, both of Pa.

[73] Assignee: Formabilities, Inc., Ardmore, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/928,120

[22] Filed: Sep. 12, 1997

[51] Int. Cl.[7] .............................. A63H 3/14; A63H 3/08; B32B 3/06

[52] U.S. Cl. ........................ 446/327; 446/98; 446/901; 428/100

[58] Field of Search ............................... 446/98, 99, 327, 446/328, 329, 486, 487, 901, 369; 428/100; 275/DIG. 30

[56] References Cited

U.S. PATENT DOCUMENTS

| | | |
|---|---|---|
| Re. 19,238 | 7/1934 | Burke . |
| 1,620,574 | 3/1927 | Savage . |
| 2,338,426 | 1/1944 | Gloeckler . |
| 2,554,408 | 5/1951 | Hile . |
| 2,592,078 | 4/1952 | Taylor et al. . |

(List continued on next page.)

FOREIGN PATENT DOCUMENTS

| | | |
|---|---|---|
| 1101604 | 10/1955 | France . |
| 1532719 | 7/1968 | France ................................. 446/327 |
| 2013508A | 8/1979 | United Kingdom . |
| 2082925A | 3/1982 | United Kingdom . |
| WO 86/00540 | 1/1986 | WIPO . |
| WO 98/40143 | 9/1998 | WIPO . |

OTHER PUBLICATIONS

Photocopy of "Your VELCRO® Connection", *Creative Educational Surplus 1998 Fall Catalog*, pp. 36 and 40.

Catalog admitted prior art "Five Little Monkeys Learning Tree", 1 page.

Photocopy of brochure "Working Walls, Inc. Conference/Meeting Room Treatments, Aesthetics, Acoustics, and Affordability", Working Walls, Inc., undated, 5 pages (admitted prior art).

Photocopy of brochure, "Toy Pole Stuffed Toy Holder", Velcro USA Inc., Jan. 1994, #202547, 1 page.

Photocopy of brochure, "MyVELCRO®Pal", Jan. 1994 #202550, 1 page.

Photocopy of brochure "the Roomies™ kooky characters with zillions of faces", Shelly Adventures, undated, 4 pages (admitted prior art).

Photocopy of advertisement The Muppet Workshop™, Jim Henson's Muppet Workshop, and attached article entitled "Licensing Scope—Henson's Muppet Workshop opens with Playskool", *Playthings*, Feb., 1994, 4 pages.

(List continued on next page.)

*Primary Examiner*—D Neal Muir
*Attorney, Agent, or Firm*—Morgan, Lewis & Bockius LLP

[57] ABSTRACT

A display system is shown which comprises, in combination, a display panel and a modular multi-layer three dimensional figure which can be readily disassembled and re-assembled in different forms. The display panel has a structural member with a first and second outer covering member, at least one of which is a hook or loop material, and which outer coverings are joined at their lateral edges in a narrow, unobtrusive seam. The figure is comprised of a plurality of first flexible elements, flat in relaxed state, and having hook or loop fabric on at least one facial surface, and a plurality of second flexible elements, also flat in relaxed state, with hook or loop material on both facial surfaces which are releasably secured to the first flexible elements. A method of making the panel and a finger or hand puppet constructed from the flexible elements are also shown.

19 Claims, 4 Drawing Sheets

U.S. PATENT DOCUMENTS

| | | |
|---|---|---|
| 3,094,330 | 6/1963 | Smith . |
| 3,316,669 | 5/1967 | Nachbar . |
| 3,564,807 | 2/1971 | Brieske .............................. 446/327 X |
| 3,726,027 | 4/1973 | Cohen et al. . |
| 3,864,871 | 2/1975 | Kaelin ..................................... 446/327 |
| 3,908,830 | 9/1975 | Skrzelowski . |
| 4,001,987 | 1/1977 | Coulthard . |
| 4,045,897 | 9/1977 | Gates . |
| 4,118,903 | 10/1978 | Coulthard . |
| 4,122,628 | 10/1978 | Crowell et al. . |
| 4,138,745 | 2/1979 | Greenspan ......................... 446/327 X |
| 4,208,832 | 6/1980 | Corriveau . |
| 4,275,520 | 6/1981 | Appleton et al. . |
| 4,403,000 | 9/1983 | Gates . |
| 4,427,390 | 1/1984 | Manger . |
| 4,504,240 | 3/1985 | Thomas . |
| 4,519,781 | 5/1985 | Boyd . |
| 4,543,278 | 9/1985 | Ackerman . |
| 4,548,375 | 10/1985 | Moss . |
| 4,579,537 | 4/1986 | Leahy . |
| 4,635,418 | 1/1987 | Hobgood . |
| 4,671,514 | 6/1987 | Wilson-Deihl . |
| 4,711,046 | 12/1987 | Herrgord . |
| 4,744,189 | 5/1988 | Wilson . |
| 4,770,292 | 9/1988 | Handler . |
| 4,780,349 | 10/1988 | Gieske et al. . |
| 4,808,139 | 2/1989 | Price . |
| 4,840,339 | 6/1989 | Grogan . |
| 4,863,127 | 9/1989 | Handler . |
| 4,879,854 | 11/1989 | Handler . |
| 4,883,441 | 11/1989 | Byer . |
| 4,884,713 | 12/1989 | Handler . |
| 4,884,988 | 12/1989 | McMurray . |
| 4,911,670 | 3/1990 | McNicholas et al. .............. 446/487 X |
| 4,926,609 | 5/1990 | Arico . |
| 4,934,522 | 6/1990 | Nelson . |
| 4,951,826 | 8/1990 | Tompkins . |
| 4,964,249 | 10/1990 | Payne . |
| 4,964,832 | 10/1990 | Bickoff . |
| 4,978,301 | 12/1990 | Dodge . |
| 4,979,924 | 12/1990 | Manger . |
| 5,040,687 | 8/1991 | Whittington . |
| 5,072,998 | 12/1991 | Oh . |
| 5,125,516 | 6/1992 | McKenna . |
| 5,136,726 | 8/1992 | Kellin et al. . |
| 5,224,895 | 7/1993 | Franz . |
| 5,242,063 | 9/1993 | Ericksen et al. . |
| 5,292,276 | 3/1994 | Manalo . |
| 5,299,968 | 4/1994 | Bennett . |
| 5,322,465 | 6/1994 | McGill . |
| 5,344,356 | 9/1994 | Pizzelli et al. . |
| 5,348,510 | 9/1994 | DuPont et al. . |
| 5,352,149 | 10/1994 | Melashenko et al. . |
| 5,366,070 | 11/1994 | Wolov . |
| 5,412,918 | 5/1995 | Wendel et al. . |
| 5,433,025 | 7/1995 | Borghese ........................... 446/327 X |
| 5,458,522 | 10/1995 | Brooks et al. . |
| 5,477,629 | 12/1995 | Gleason, Jr. . |
| 5,492,476 | 2/1996 | Ball et al. . |
| 5,516,183 | 5/1996 | Gold . |
| 5,540,609 | 7/1996 | Hoag .................................. 446/901 X |

OTHER PUBLICATIONS

Photocopy of packaging, "Creative Play Educational, Mask Making Kit", Creative Education of Canada, Inc., undated, 2 pages (admitted prior art).

Photocopy of advertisement, "Ghent Flannel Boards" and "Combination Porcelain–on–Steel Chalkboard & Flannel Board", undated, 1 page (admitted prior art).

Photocopy of catalog page, "Furniture & Equipment—Hook & Loop Instructional Backs; Magnetic Loopboard; Big Book Easel/Storage", Becker, 1994, 1 page.

Photocopy of catalog page, "FELTKids", undated, 1 page (admitted prior art).

Photocopy of catalog pages "RoleOvers®", *Environments*, 1996, pp. 140, 141.

Photocopy of catalog page, "Space Dividers", *Hammett*, 1995–1996, p. 699.

Photocopy of packaging, "Shape–a–roos™", Dragons Are Too Seldom, Inc., undated, 2 pages (admitted prior art).

Photocopy of brochure, "rainbow board", Kidderoo creative toys, undated, 2 pages (admitted prior art).

Photocopy of catalog page, "Classroom Dividers & Teaching Aids", Holbrook, undated, p. 35 (admitted prior art).

Photocopy of brochure, "VELCRO® Puppet Playhouse", Velcro USA Inc., Aug. 1995, 1 page.

Photocopy of brochure, "Puppet Magic", Velcro USA Inc., #203379, undated, 1 page (admitted prior art).

MODULAR MULTI-LAYER THREE-DIMENSIONAL FIGURES FROM REARRANGABLE FLEXIBLE ELEMENTS

BACKGROUND OF THE INVENTION

Display systems for use in instructional situations, such as class-rooms, convention booths, and the like, have long been known. The systems typically involve some type of display panel, capable of standing alone or being arranged in a group, or being affixed to a wall, alone or in an array. Informational materials, in the form of letters, numbers, pictorial images, or other shapes are often affixed to such panels, and may be affixed by various means, including magnetic attachment media, open staples or tacks, adhesives, or the like.

Such systems have often been employed in settings where children play, but allowing the children themselves to play with the display pieces has been limited for a number of reasons, including the hazards associated with staples and tacks, or chemical adhesives or the like, or the costs of magnetic attachment media.

In recent years, another attachment means has become popular which employs hook or loop fabric, commonly known and commercially available under the trademark VELCRO® or VELTEX® brand loop laminates, and several references show display systems employing such hook or loop fabric connectors. For the most part, however, the display panels which employ such hook or loop fabric have been limited because of the necessary weight of the supporting substrate and the complex construction. Conventional hook or loop display panels have generally been of two construction types. In the first type, a groove is cut into the side face of the structural material, and the lateral edge of the hook or loop fabric, or both lateral edges if the panel is to be two-sided, are tucked into the groove and adhesively bonded. The second type of construction is to wrap and adhesively bond a lateral edge of a first hook or loop fabric around a lateral edge of a first support structure, wrap and adhesively bond a lateral edge of a second hook or loop fabric around a lateral edge of a second support structure, then bond together the two support structures back-to-back with the fabric facing outwardly. Such construction methods mandate a display panel of significant weight, thickness and, most importantly, expense.

At the same time, children have been provided with numerous three-dimensional toys permitting the attachment of colors and shapes to a stuffed doll or three-dimensional stuffed object with hook or loop fabric. However, such toys limit the child's imagination to creating different figures around a base stuffed doll or three-dimensional object. Other known three-dimensional-figure toys include a set of blocks covered with hook or loop fabric which can be arranged in different patterns to create different toy figures, such as trains, cars and people. However, the set of blocks covered with hook-and-loop material limits the child's imagination to creating figures with static, non flexible elements. There is a need in the toy/education field for a toy which will allow a child to make three-dimensional figures which permit the maximum use of the child's imagination. The present invention meets this need by providing a plurality of flexible elements which are constructed of hook-and-loop material which can be releasably attached to each other to form limitless different figures. Such figures can be releasably attached to display panels which are constructed of hook-and-loop material, such as the display panels known in the art, or the display panels of the present invention.

BRIEF SUMMARY OF THE INVENTION

Briefly stated, the present invention discloses a modular multi-layer, three dimensional figure which can be readily disassembled and re-assembled in a wide variety of various different forms. The modular figure comprises a plurality of first flexible elements, each first element comprising a substantially flat, planar shape when in a relaxed state. The first flexible elements have a first and second facial surface, with at least one of the facial surfaces constructed of a hook or loop fabric. The modular figure further comprises a plurality of second flexible elements, each second element comprising a substantially flat, planar shape when in a relaxed state. The second flexible elements have a first and second facial surface, with each of the surfaces of the second flexible elements being constructed of a hook or loop fabric. At least a portion of the plurality of first and second elements are releasably attached in a relaxed or unrelaxed state, to each other by the hook or loop fabric in multi-layers and in a first pattern to form a first figure. The plurality of first and second elements which form the first figure are separable from each other. At least a portion of the first and second elements which formed the first figure are again releasably attached to each other by the hook or loop fabric in multi-layers and in a second pattern either alone or in combination with other of the first and second elements which were not used to form the first figure to form at least a portion of a second figure. Therefore, a limitless variety of multi-layer, three dimensional figures may be assembled by rearranging the first and second elements and employing the flexibility of the first and second elements to create limitless multilayer, three dimensional figures.

A further aspect of the present invention is a finger or hand puppet comprising a first flexible element itself comprising a substantially flat, planar shape in a relaxed state. The first flexible element is constructed of first and second plies each having an outer facial surface and an inner facial surface, respectively, with at least one outer facial surface constructed of hook or loop fabric. In addition, each first and second ply has a lateral edge with the lateral edges being joined together. The first element may be folded inwardly at some point along the joined lateral edge to form an inner pocket capable of accommodating a finger or hand. The hand or finger puppet further comprises a plurality of second elements, with each said second element comprising a first and second facial surface with a first facial surface being constructed of hook or loop material releasably engageable with the hook or loop fabric of the first element. The second elements may be selectively joined to the first element to construct a puppet.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings the embodiments which are presently preferred, it being understood, however, that the invention is not limited to the specific methods and instrumentalities disclosed. In the drawings.

DETAILED DESCRIPTION OF THE INVENTION

Certain terminology is used in the following description for convenience only and is not limiting. The words "right," "left," "lower," and "upper" designate directions in the drawings to which reference is made. The terminology includes the words above specifically mentioned, derivatives thereof and words of similar import The display system of the present invention consists of an interactive system of modular components which allow adults and children to create an unlimited variety of two or three dimensional, pictorial images, patterns and designs which can be displayed independently or on display panels. The panels are constructed of a lightweight, rigid material such as the corrugated plastic material Coroplast, and are covered front-to-back with a hook or loop material. These panels can be arranged in a variety of manners, such as by mounting vertically on a wall or easel, used horizontally on a floor or table, or attached to similar panels to create a free-standing display unit, such as a pup-tent. The panels can be attached to a wall by using hook or loop fabric tape or coins, which may be adhesively mounted or stapled to a wall. The panel is then pressed into place with opposing hook or loop fabric engaging the hook or loop fabric pieces mounted on the wall. A plurality of display panels can be placed together to create a large interactive wall area, giving the panels application in trade show and display industries, as well as for education and children's play.

Further, the modular design permits independent use, and the panels can function as an element of the constructed figure as well. The modular nature of the system allows creative figures to be made on the panels, or independent of the panels, as free-standing soft toys, finger puppets, costumes, hats and sculptural artistic creations. As used herein, the term "figure" is not limited to constructing impressions of organic beings, but includes impressions of inorganic items of a variety of different sizes and colors, which can be organized in a variety of different ways to create individual artistic impressions, such as a rocket, tool belt, wrist watch, and the like or multiple artistic impressions such as scenes and murals.

Figure 1:
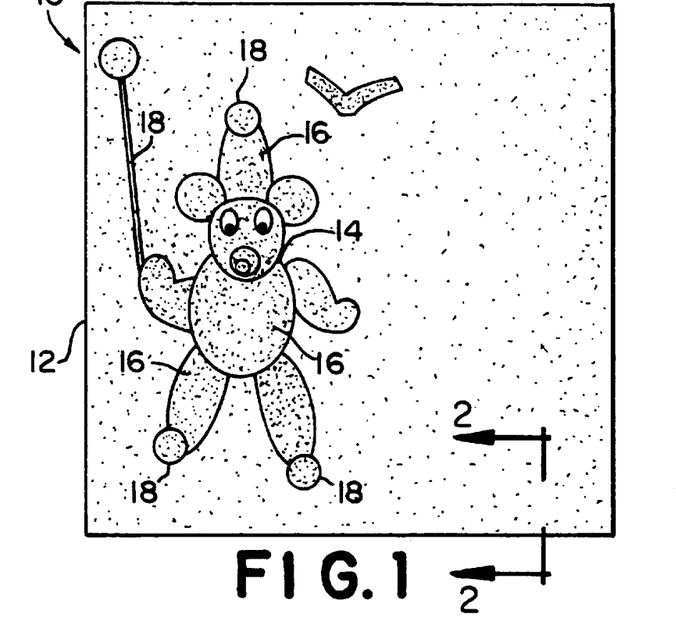
FIG. 1 is a front elevational view of a display panel in accordance with a preferred embodiment of the present invention with a modular, multi-layer figure assembled of first and second flexible elements releasably attached thereto.
Figure 2:
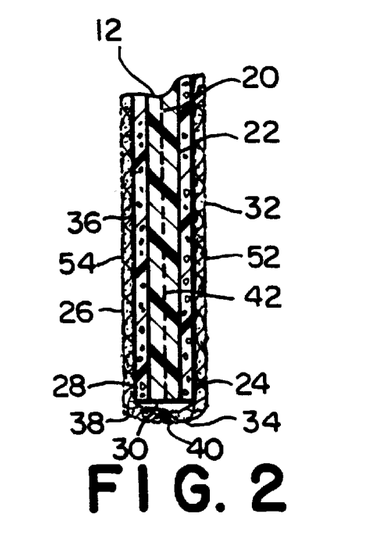
FIG. 2 is a cross-sectional view of a portion of the display panel shown in FIG. 1, taken along line 2—2.

Referring to the drawings, wherein like numerals indicate like elements throughout, there is shown in FIG. 1 a display system, shown generally as 10, comprising a display panel 12 in combination with a modular, multi-layer FIG. 14 assembled of a combination of first flexible elements 16 and second flexible elements 18 releasably attached thereto. FIG. 2 is a cross-sectional view of a portion of the display panel 12 shown in FIG. 1, taken along line 2—2. In the greater detail of this view, the display panel 12 comprises a structural member 20 having a first surface 22 defined by a lateral edge 24, a second opposite surface 26 defined by a lateral edge 28, and a side face 30 joining the lateral edge 24 of the first surface 22 and the lateral edge 28 of the second surface 26. The structural member 20 is preferably made of a rigid, lightweight material and, more preferably, is made of a corrugated polymeric material, such as that commercially available under the trade name Coroplast, or a mineral fiber material. Preferably, the structural member 20 has a thickness in the range of about three millimeters (3 mm.) to about ten millimeters (10 mm.). Corrugated polymeric boards are well understood by those of ordinary skill in the art and, therefore, further description thereof is omitted for convenience and brevity only and is not limiting.

The display panel 12 is further comprised of a first outer covering 32 comprising a hook or loop fabric. As used herein the term "fabric" is broadly defined to include woven and nonwoven substrates of any semi-flexible material, including polymers and other materials used to construct hook material. The first outer covering 32 is in facing engagement with the first surface 22 of the structural member 20, and has a lateral edge 34 positioned beyond the lateral edge 24 of the first surface 22 of the structural member 20. In addition, the display panel 12 is provided with a second outer covering 36 in facing engagement with the second surface 26 of the structural member 20. The second outer covering 36 has a lateral edge 38 positioned beyond the lateral edge 28 of the second surface 26 of the structural member 20. The lateral edge 34 of the first outer covering 32 and the lateral edge 38 of the second outer covering 36 are joined to each other at a point 40 proximate to the side face 30 of the structural member 20 in a narrow, unobtrusive seam 42. In the preferred embodiment, the first outer covering 32 and second outer covering 36 are bonded to the first surface 22 and second surface 26 of the structural member 20, respectively, in a manner which will be understood by those of ordinary skill in the art. However, it is understood by those of ordinary skill in the art from this disclosure that the first outer covering 32 and the second outer covering 36 could be bonded only at seam 42 and not along the first and second surfaces 22, 26, without departing from the spirit and scope of the invention.

The seam construction allows adjacent panels to abut closely against one another while providing an uninterrupted surface between panels because the end seals are minimized. It has been found useful to create such a narrow, substantially unobtrusive seam 42 by joining the lateral edge 34 of the first outer covering 32 and the lateral edge 38 of the second outer covering 36 and heat sealing the edges 34,38 together, such as with a heated platen die. Satisfactory results can be obtained in other ways, such as by welding the lateral edge 34 of the first outer covering 32 and the lateral edge 38 of the second outer covering 36 with ultrasonic sound or radio frequency energy. While it is necessary that at least one surface of the display panel 12 be at least partially provided with hook or loop fabric, and may be provided with portions of both types, it is useful to provide in entirety both sides of the display panel 12 with such material. Thus, where coverage of one side would be adequate to provide a display panel 12 for use on a wall or in an array of such panels on a wall, provision of hook or loop fabric on both sides would allow the display panel 12 to be useful in free-standing display functions.

Further, in the present embodiment, a layer of padding 52 is provided between the first outer covering 32 of hook or loop fabric, and the first surface 22 of the support member 20. Similarly, in the present embodiment, a second layer of padding 54 is provided between the second outer covering 36 and the second surface 26 of the support member 20, particularly if the second outer covering 36 is also comprised of hook or loop fabric. The padding 52 between the first outer covering 32 and the first surface 22 of the support member 20, and the padding 54 between the second outer covering 36 and the second surface 26 of the support member 20 may advantageously be comprised of a polymeric foam, or any other suitable soft, resilient material which is formed as part of the hook or loop fabric and can be heat sealed or ultrasonically bonded.

It is envisioned that the display panel 12 of the display system 10 of the present embodiment may be constructed in the following manner. First, a first outer covering 32 comprising a hook or loop fabric is positioned in facing engagement with a first surface 22 of a structural member 20, with a lateral edge 34 of the first outer covering 32 being positioned beyond a lateral edge 24 of the first surface 22 of the structural member 20. Then, a second outer covering 36 is positioned in facing engagement with a second surface 26 of the structural member 20, with a lateral edge 38 of the second outer covering 36 being positioned beyond a lateral edge 28 of the second surface 26 of the structural member 20. The first and second outer coverings 32, 36 may be secured to the structural member using conventional techniques well understood by those of ordinary skill in the art, such as by using an adhesive or contact cement (not shown). Finally, the lateral edge 34 of the first outer covering 32 and the lateral edge 38 of the second outer covering 36 are joined to each other at a point 40 proximate to the side face 30 of the structural member 20 to form a narrow, unobtrusive seam 42. Again, the creation of the seam 42 may be accomplished by heating the lateral edge 34 of the first outer covering 32 and the lateral edge 38 of the second outer covering 36, such as with a heated platen die, or with ultrasonic sound or radio frequency energy, or any other suitable manner.

The display panel 12 of the present invention represents an improvement over the prior art in the manner in which the lateral edge 34 of the first outer covering 32 and the lateral edge 38 of the second outer covering 36 are joined together in a narrow, unobtrusive seam 42. This type of junction allows a much thinner substrate to be employed. In the prior art, it was taught that the lateral edges of the covering fabric should be wrapped around and tucked into a groove or channel cut in the supporting substrate, requiring a thicker and stronger substrate to support the groove. One of the advantages of the present invention is that a thinner, lighter weight support member 20 may be used in the construction of the display panel 12. Thus, the display panel 12 of the present invention may have a structural member 20 with a thickness in a range of about 3 millimeters to about 10 millimeters, and may advantageously be constructed of corrugated plastic. One skilled in the art would recognize from this disclosure that the present invention is not limited to constructing the structural member 20 of any particular structural material. In this regard, it is believed that many natural or artificial materials, such as mineral fiber board, masonite, press-wood, foam core board, or various multilayer constructions would prove suitable.

The display system of the present invention, as shown in FIG. 1, further includes a modular multi-layer, three dimensional FIG. 14, which can be readily disassembled and re-assembled in various different forms using some or all of the design elements, or adding others. This modular FIG. 14 itself is comprised of a plurality of first flexible elements 16 and a plurality of second flexible elements 18.

Figure 4:
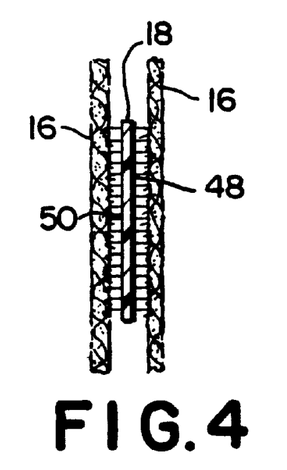
FIG. 4 is a cross-sectional view of two first flexible elements constructed of loop-type fabric releasably assembled together with an intermediate second flexible element having hook-type fabric on both facial surfaces.
Figure 5:
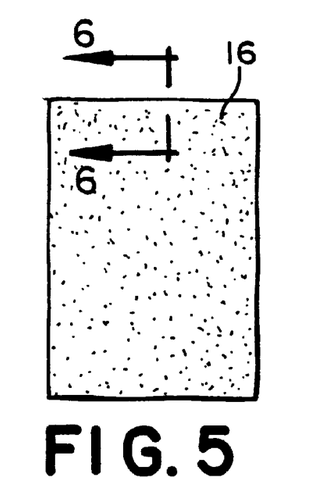
FIG. 5 is an elevational view of a facial surface of a first flexible element, showing detail of the loop-type fabric.
Figure 6:
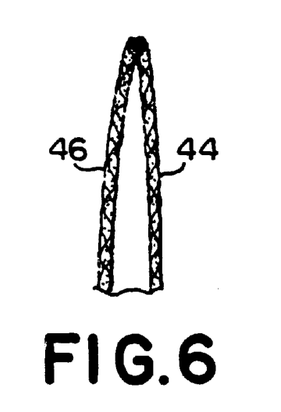
FIG. 6 is a cross-sectional view of a portion of the first flexible element of FIG. 5, taken along line 6—6.

FIG. 5 shows a first flexible element 16 which may be assembled with similar elements to form a figure. FIG. 6 shows a cross-sectional view of a portion of the first flexible element of FIG. 5, taken along line 6—6. Each of the first elements 16, such as the one shown in FIGS. 5 and 6, comprise a substantially flat, planar shape in a relaxed state. Further, each such first flexible element 16 has a first facial surface, shown as 44 in FIG. 6, and second facial surface, shown as 46 in FIG. 6, with at least one of these facial surfaces being constructed of a hook or loop fabric. In the present embodiment it is preferred that the first and second facial surfaces 44, 46 be constructed of loop material. However, it is understood by those of ordinary skill in the art from this disclosure that the present invention is not limited to constructing the first flexible element 16 of loop material on both sides. An alternative construction might have (1) loop material on one side with hook material on the other side or (2) loop material on one side with neither hook or loop material on the other side (not shown), without departing from the spirit and scope of the invention. Further, a suitable first flexible element 16 may be constructed of only a single ply of hook or loop fabric, as shown in FIG. 4.

Figure 3:
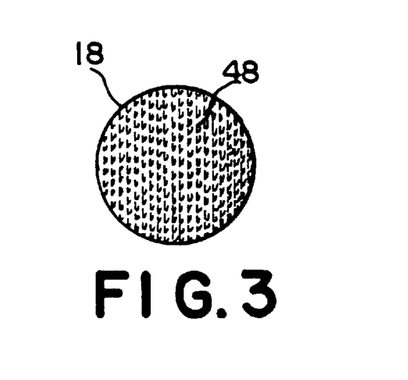
FIG. 3 is an enlarged elevational view of a facial surface of a second flexible element, showing detail of the hook-type fabric.

FIG. 3 is a greatly enlarged view of a first facial surface 48 of a second flexible element 18, with detail of the hook-type fabric on the first facial surface 48 being shown. FIG. 4 is a cross-sectional view of two first flexible elements 16 constructed of loop-type fabric releasably assembled together with an intermediate second flexible element 18 having hook-type fabric on both the first facial surface 48 and a second facial surface 50. Each of the second elements 18, such as the one shown in FIGS. 3 and 4, comprise a substantially flat, planar shape in a relaxed state. While it is preferred that the second flexible elements 18 be constructed of hook-type fabric on both the first and second facial surfaces 48, 50, it is understood by those of ordinary skill in the art from this disclosure that one or both facial surfaces 48, 50 could be constructed of loop-type fabric. In this manner, the plurality of first elements 16 and second elements 18 may be releasably attached to each other by hook or loop fabric in multilayer arrangements.

Figure 10:
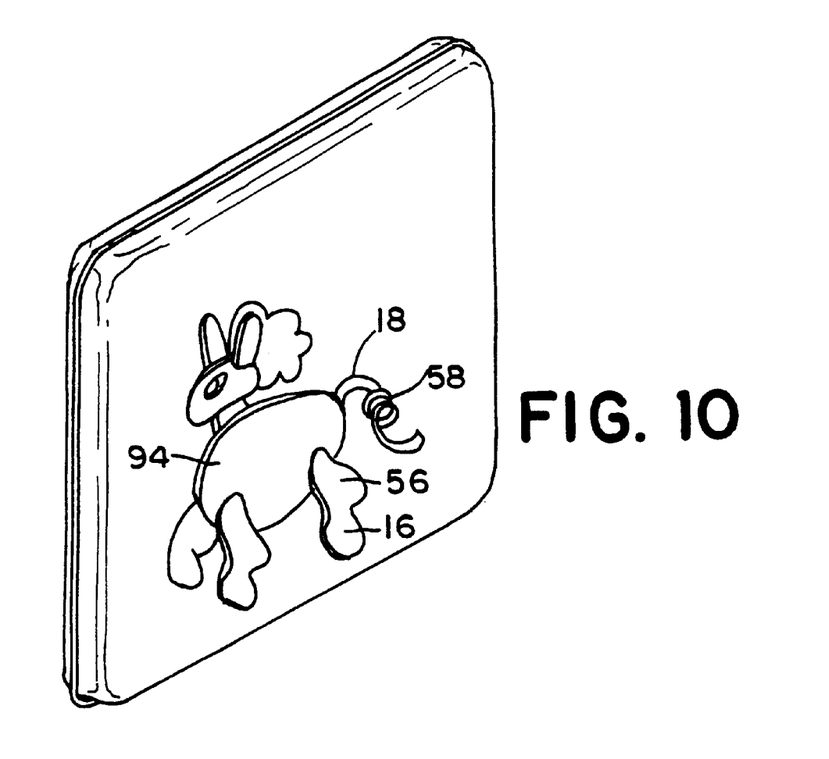
FIG. 10 is a perspective view of the display panel of the present invention with another modular, multi-layer figure assembled of first and second flexible elements releasably attached thereto.

As shown in FIG. 1, at least a portion of said plurality of first and second elements 16, 18 are releasably attached to each other by said hook or loop fabric in multilayers and in a first pattern to form a first FIG. 14. The plurality of first and second elements 16, 18 which form the first FIG. 14 are separable from each other. At least a portion of the first and second elements which formed the first FIG. 14 are again releasably attached to each other by the hook or loop fabric in multilayers and in a second pattern either alone or in combination with other of the first and second elements 16, 18 which were not used to form the first FIG. 14 to form at least a portion of a second FIG. 94, as shown in FIG. 10. Therefore, a wide variety of multi-layer, three dimensional figures may be assembled by rearranging the first and second elements 16, 18 and employing the flexibility of the first and second elements 16, 18 to create multi-layer, three dimensional figures, as described in more detail below. Stated another way, such first elements 16 and second elements 18 may be assembled when relaxed or unrelaxed in a first pattern to form a first FIG. 14, with the plurality of first elements 16 and the plurality of second elements 18 being separable from each other. The same elements, or some of them, may be again releasably attached when relaxed or unrelaxed to each other and other similar elements by said hook or loop fabric in multilayers and in a second pattern to form a second FIG. 94, as shown in FIG. 10.

FIG. 10 is a perspective view of the display panel 12 of the present invention with another modular, multi-layer FIG. 94 assembled of some of the same first flexible elements 16 and second flexible elements 18 along with similar elements, all releasably attached, relaxed and unrelaxed, thereto. In this manner a wide variety of multi-layer, three dimensional figures may be assembled by rearranging the first elements 16 and second elements 18 and employing the flexibility of the first elements 16 and the second elements 18 to create the multi-layer, three dimensional figures. In FIG. 10, a first flexible element 16 is shown formed into a three-dimensional form 56, while a second flexible element 18 is twisted into a three-dimensional form 58.

Figure 7:
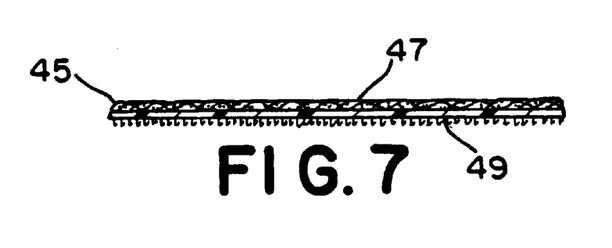
FIG. 7 is a cross-sectional view of a third flexible element provided with loop-type fabric on a first facial surface and hook-type fabric on a second facial surface.

In one preferred embodiment, satisfactory results have heretofore been obtained with the use of first flexible elements 16 provided with loop-type fabric on both first facial surfaces 44 and second facial surfaces 46, as shown in FIG. 6. Likewise, satisfactory results have heretofore been obtained with the use of second flexible elements 18 provided with hook-type fabric on both first facial surfaces 48 and second facial surfaces 50, as shown in FIG. 4. As mentioned above, the present invention is not limited to such constructions, and first flexible elements 16 with hook-type fabric on one or both surfaces as well as second flexible elements 18 with loop-type fabric on one or both facial surfaces could well be employed in the practice of the present invention as well. In addition, FIG. 7 is a cross-sectional view of a third flexible element 45 provided with loop-type fabric on a first facial surface 47 and hook-type fabric on its second facial surface 49, a construction which is also within the scope of the present invention. Furthermore, the present invention is not limited to constructing of any of the first, second or third elements 16, 18, 45 of any particular shape. For instance, the first, second or third elements 16, 18, 45 could be generally square, circular, oval, triangular, etc., without departing from the spirit and scope of the invention.

Manufacture of first flexible elements, second flexible elements or third flexible elements 16, 18, 45, may be from loop-type fabric of natural or artificial materials commercially available from a number of manufacturers, including a nonwoven spun nylon product commercially available as VELTEX®. These fabrics typically require the use of a compatible backing or internal layer of padding, and commercially available constructions are typically a loop-type fabric of nylon laminated to a polymeric foam, such as a polyester foam. The most commonly available material also has an additional knit backing laminated to the underside of the foam, forming a finished underside to the loop-type fabric. In the practice of the present invention, two types of materials have been employed satisfactorily.

The first of these materials is typically employed in a single-ply construction, with a first layer of loop-type nylon fabric, typically of a first color, an inner foam layer, and a second, opposing layer of loop-type nylon fabric, typically of a second color. There is no internal knit-type backing and the construction cannot be pulled apart by pinching and separating the two layers of loop-type fabric, though the construction is flexible and can be twisted and turned. While this type of construction may include a finished edge, it is not required.

A second construction, employing loop type material, includes a double-ply construction. The double ply construction employs two separate pieces of foam-backed loop-type nylon fabric with the foam sides facing inward, and either or both may include an internal knit-type backing. The two separate foam backed loop-type fabrics may be sealed together at their lateral edges by any process which provides a secure joining, with a substantially flexible, nominal edging. This may be done satisfactorily by heat sealing with a heated die, ultrasonic bonding, or a very fine stitching machine sewn around the lateral edges. This type of construction, in addition to being flexible and providing an element which can be twisted and turned, can be pinched in the center and separated by pulling in opposite directions up to the point of the joined edges.

Figure 8:
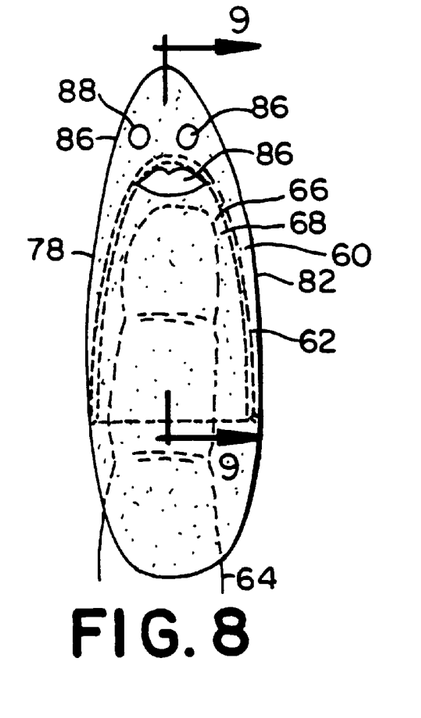
FIG. 8 is an elevational view of a finger puppet constructed from a first flexible element, with a user's finger in phantom.
Figure 9:
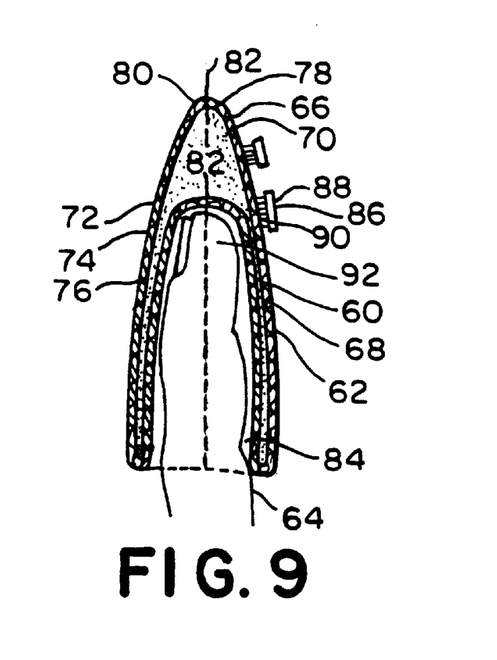
FIG. 9 is a cross-sectional view of the finger puppet of FIG. 8, taken along line 9—9.

This second type of construction also permits the flexible element to be used in an additional manner, and FIG. 8 shows a finger puppet 60 constructed from a first flexible element 62, with a user's finger 64 in phantom. FIG. 9 shows a cross-sectional view of the finger puppet 60 of FIG. 8, taken along line 9—9. This puppet 60 comprises a first flexible element 62 comprising a substantially flat, planar shape in a relaxed state, and being constructed of a first ply 66 and a second ply 72. The first ply 66 has an outer facial surface 68 and an inner facial surface 70, respectively, and the second ply 72 has an outer facial surface 74 and an inner facial surface 76. At least one of these outer facial surfaces, the outer facial surface 68 of the first ply 66 or the outer facial surface 74 of the second ply 72, is constructed of hook or loop fabric. The first ply 66 is defined by a lateral edge 78 and the second ply 72 is defined by lateral edge 80, with lateral edge 78 and lateral edge 80 being joined together by some method as described hereinabove to form a seam 82. In creating the puppet 60, the first flexible element 62 may be folded inwardly at some point along the seam 82 created by the joinder of lateral edge 78 and lateral edge 80 to form an inner pocket 84 capable of accommodating a finger 64, a hand, an upright hand-held stick, or some other suitable structure.

Figure 11:
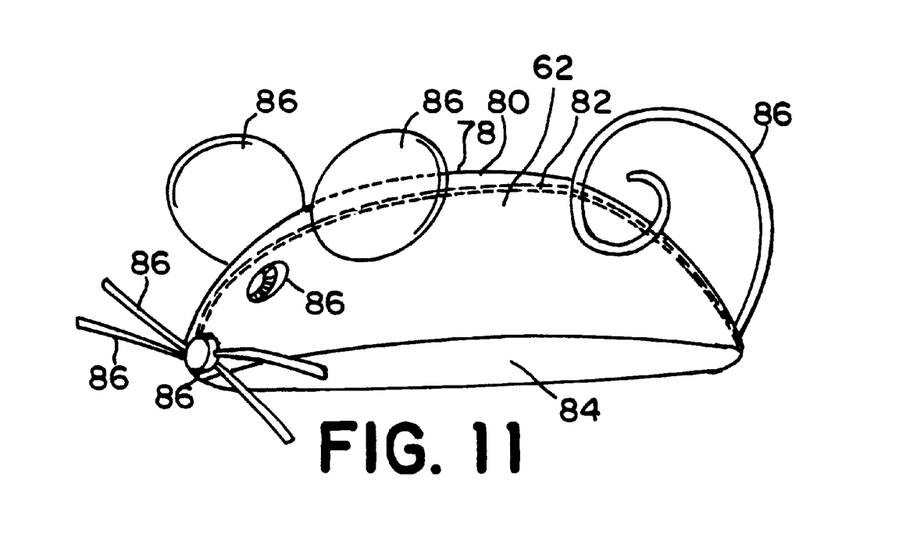
FIG. 11 is a bottom perspective view of a freestanding three-dimensional figure constructed from the first flexible element of FIG. 8, with the addition of other second flexible elements.

Alternatively, a first flexible element 62, folded inwardly in this manner, can be employed as free-standing figure, as shown in FIG. 11. In this view, the first flexible element 62, is folded inwardly at some point along the seam 82 created by the joinder of lateral edge 78 and lateral edge 80 to form an inner pocket 84. The stylized representation of a mouse thus created has sufficient stability to stand alone. It can be used as an independent plaything, or be attached to another figure or a display panel.

Again with reference to FIG. 8, the puppet 60 further comprises a plurality of second elements 86, with each second element 86 comprising a first facial surface 88 and a second facial surface 90 with at least one facial surface being constructed of hook or loop material capable of releasably engaging with said hook or loop fabric of the first element 62, and which second elements 86 may be selectively joined to the first element 62 to construct a puppet 60.

If the first flexible element 62 is large enough, the inner pocket 84 can accommodate a user's hand, rather than a finger. In addition, the first flexible element 62 can be provided with hook or loop material on both the outer facial surface 68 of the first ply 66 and the outer facial surface 74 of the second ply 72, and the hook or loop material may be of the same type or different types as the hook or loop material described above. Further, the first flexible element may be provided with an internal layer of padding 92.

The flexible nature of the flexible elements employed herein permit the maximum use of a child's imagination in designing and creating three-dimensional figures. These figures may be displayed on a display panel, such as the display panel of the present invention, used as finger or hand puppets, as free-standing creations, or apparel. Further, the interchangability of the elements allow a child to alter an existing figure easily, or disassemble a figure and create an entirely new figure completely in a short period of time. At the same time the display panel and flexible elements permit use in education, trade show and other display industries.

From the foregoing description, it can be seen that the present invention comprises an interactive display wall system including a display panel and a modular multi-layer, three dimensional figure which can be readily disassembled and re-assembled in different forms, and which modular figure may be comprised, in part, of a flexible element which can be used as a finger puppet. It will be appreciated by those skilled in the art that the changes and modifications may be made to the above-described embodiments without departing from the inventive concept thereof. It is understood, therefore, that the present invention is not limited to the particular embodiments disclosed, but is intended to include all modifications and changes which are within the scope and spirit of the invention as defined by the appended claims.

What is claimed is:

1. A soft sculpture toy kit in which a plurality of modular multi-layer, three dimensional figures can be readily assembled and re-assembled in different forms, said toy kit comprising:

at least one first flexible hook material element, each said first element being in one of a substantially flat, planar shape in a relaxed state and a nonplanar three dimensional shape in an unrelaxed state, the first element having a first and second facial surface, with at least one of said facial surfaces being constructed substantially entirely of a hook material;

at least one second flexible loop material element, each said second element being in one of a substantially flat, planar shape in a relaxed state and a nonplanar three dimensional shape in an unrelaxed state, the second element having a first and second facial surface, with at least one of said surfaces of said second element constructed substantially entirely of a loop material; and at least one third flexible material element, each said third element including a two ply configuration and arrangeable with said first and second elements wherein at least a portion of said first element in said relaxed state can be releasably attached to a portion of said second element in said relaxed state, said first element in said relaxed state can be releasably attached to a portion of said second element in said unrelaxed state, a portion of said first element in said unrelaxed state can be releasably attached to a portion of said second element in said relaxed state, a portion of said first element in said unrelaxed state can be releasably attached to said second element in said unrelaxed state such that any two of said first, second and third elements can be releasably attached by said loop and hook material and arranged in a first multilayer pattern to form a first figure, at least a portion of said any two of said first, second and third elements which formed said first figure being again releasably attachable to each other by said hook or loop material in multilayers and in a second pattern either alone or in combination with other of said first, second and third elements which were not used to form the first figure to form at least a portion of a second figure, whereby a variety of multilayer, three dimensional figures may be assembled by rearranging any two of said first, second and third elements in relaxed states, unrelaxed states, and permutations thereof and employing the flexibility of said any two of said first, second and third elements to create singular or multiple, multi-layer, three dimensional figures.

2. The modular figure of claim 1 wherein at least a portion of said first elements are provided with hook or loop fabric on both facial surfaces.

3. The modular figure of claim 1 wherein at least a portion of said first elements are further provided with an internal layer of padding between said first and second facial surfaces.

4. The modular figure of claim 1 wherein at least a portion of said first elements are provided with loop fabric on both facial surfaces.

5. The modular figure of claim 4 wherein a least a portion of said first elements are provided with two ply loop fabric.

6. The modular figure of claim 4 wherein at least a portion of said second elements are provided with hook fabric on both facial surfaces.

7. The modular figure of claim 6 further comprising at least one third flexible element, said third element comprising a substantially flat, planar shape in a relaxed state and having a first and second facial surface, said first facial surface being constructed of a hook fabric and said second facial surface being constructed of a loop fabric.

8. The modular figure of claim 4 wherein at least a portion of said second elements are provided with hook fabric on both facial surfaces.

9. The modular figure of claim 1 wherein at least a portion of said first elements are provided with loop fabric on said first facial surface and hook fabric on said second facial surface.

10. The modular figure of claim 1 wherein at least a portion of said second elements are provided with loop fabric on said first facial surface and hook fabric on said second facial surface.

11. A finger or hand puppet comprising:

a first flexible element comprising a substantially flat, planar shape in a relaxed state, and being constructed of first and second plies each having an outer facial surface and an inner facial surface, respectively, with at least one said outer facial surface being constructed of hook or loop material, each said first and second plies having a lateral edge with said lateral edges being joined together along a substantially unending continuous length to enclose a predefined area, and wherein said first element may be folded inwardly at substantially any point along said joined lateral edge to form an inner pocket capable of accommodating a finger or hand;

a plurality of second elements, each said second element comprising a first and second facial surface with a first facial surface being constructed of hook or loop material releasably engageable with said hook or loop material of said first element and which second elements may be selectively joined to said first element to construct a puppet.

12. The puppet of claim 11 wherein said first element is provided with hook or loop fabric on both facial surfaces.

13. The puppet of claim 11 wherein said first and second plies further include an internal layer of padding.

14. The puppet of claim 12 wherein said first element is provided with loop fabric on both facial surfaces.

15. The puppet of claim 11 wherein at least a portion of said second elements are provided with hook fabric on both facial surfaces.

16. The puppet of claim 12 wherein said first element is provided with loop fabric on said first facial surface and hook fabric on said second facial surface.

17. The modular figure of claim 11 wherein at least a portion of said second elements are provided with loop fabric on said first facial surface and hook fabric on said second facial surface.

18. A modular multi-layer, three dimensional figure kit which can be readily assembled, disassembled and re-assembled in different forms, said modular figure kit comprising:

at least one first flexible hook material element, each said first element be in one of a substantially flat, planar shape in a relaxed state and a nonplanar three dimensional shape in an unrelaxed state, the first element having a first and second facial surface, with at least one of said facial surfaces including a hook material on substantially its entire surface;

at least one second flexible loop material element, each said second element being in one of a substantially flat, planar shape in a relaxed state and a nonplanar three dimensional shape in a unrelaxed state, the second element having a first and second facial surface, with at least one of said surfaces of said second element being constructed substantially entirely of a loop material; and at least one third flexible loop material element, each said third element being in one of a substantially flat, planar shape in a relaxed state and a nonplanar three dimensional shape in an unrelaxed state, the third element including a front surface and a back surface each of which being constructed of a loop material, wherein at least a portion of said first element in said relaxed state being releasably attachable to a portion of said second element in said relaxed state, said first element in said relaxed state being releasably attachable to a portion of said second element in said unrelaxed state, a portion of said first element in said unrelaxed state being releasably attachable to a portion of said second element in said relaxed state, a portion of said first element in said unrelaxed state being releasably attachable to said second element in said unrelaxed state such that any two of said first, second and third elements are releasably attachable by said hook and loop material and can be arranged in a first multilayer pattern to form a first figure, at least a portion of said any two of said first, second and third elements which formed said first figure being again releasably attachable to each other by said hook or loop material in multilayers and in a second pattern either alone or in combination with other of said first, second and third elements which were not used to form the first figure to form at least a portion of a second figure, whereby a wide variety of multi-layer, three dimensional figures may be assembled by rearranging any two of said first, second and third elements in relaxed states, unrelaxed states, and permutations thereof and employing the flexibility of said any two of said first, second and third elements to create multi-layer, three dimensional figures.

19. A self-supporting toy structure kit that can be arranged to create various three-dimensional multi-layer figures, said kit comprising:

at least one first flexible hook material element, each said first element being in one of a substantially flat, planar shape in a first state and a nonplanar three dimensional shape in a second state, each first element having a first and second facial surface, at least one of which is constructed of a hook material;

at least one second flexible hook or loop material element, each said second element configurable between a substantially flat, planar shape in a first state and a nonplanar three dimensional shape in a second state, the second element having a front and back facial surface with a peripheral edge, at least one of said front and back facial surfaces being constructed of a hook or loop material, the front and back facial surfaces being connected to each other about their respective peripheral edges to define a tucking area in between the front and back facial surfaces, wherein a portion of the front and back facial surfaces can be tucked at substantially any point about their respective peripheral edges into the tucking area to form a three dimensional figure; and whereby a variety of multi-layer, three dimensional figures may be assembled by rearranging and attaching said first and second elements and employing the flexibility of said first and second elements to create singular or multiple, multi-layer, three dimensional figures.

* * * * *